Feb. 11, 1958  E. E. WALLACE  2,822,891
APPLICATION VALVE
Filed Aug. 5, 1955
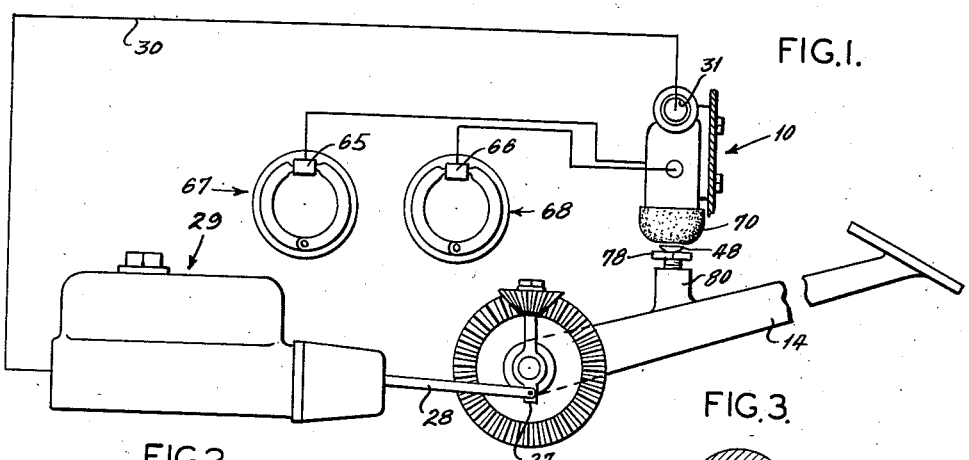
FIG.1.
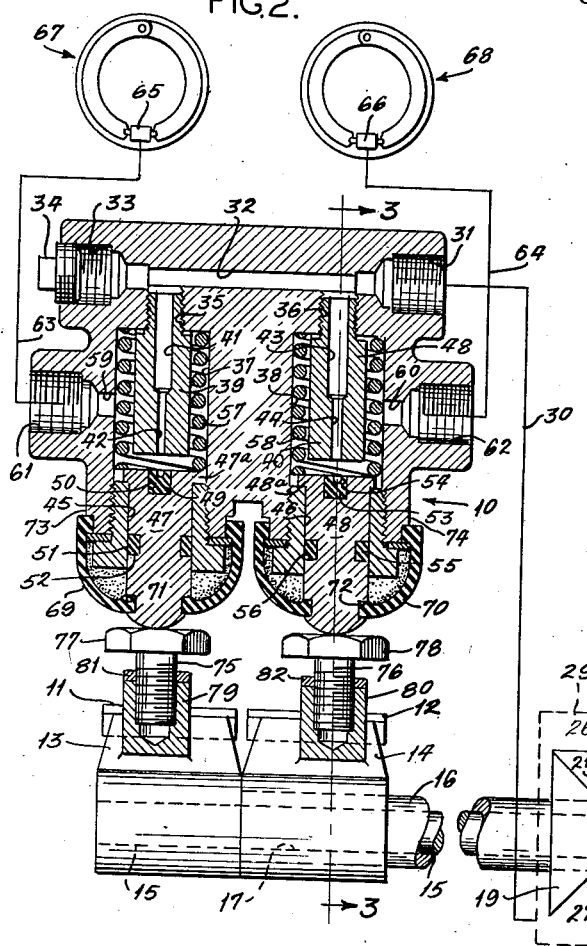
FIG.2.
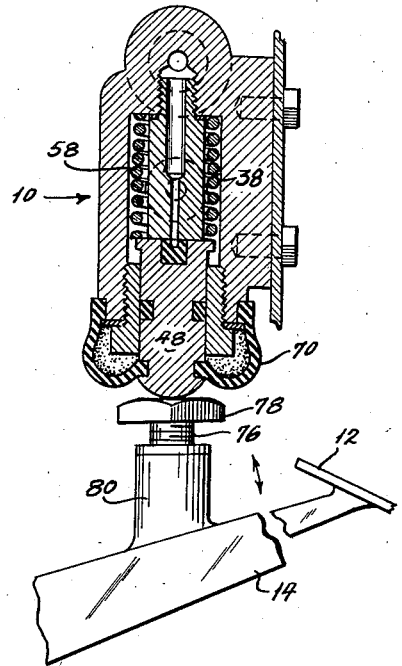
FIG.3.
FIG.4.
INVENTOR
EUGENE E. WALLACE
By Gravely, Lieder, Woodruff and Wills
ATTORNEYS.

United States Patent Office 2,822,891
Patented Feb. 11, 1958

2,822,891

APPLICATION VALVE

Eugene E. Wallace, Kirkwood, Mo., assignor to Wagner Electric Corporation, St. Louis, Mo., a corporation of Delaware Application August 5, 1955, Serial No. 526,698

2 Claims. (Cl. 188—152)

This invention relates generally to valves for fluid brake systems on vehicles and particularly to valves for tractors and similar devices where it is desirable to assist steering by means of a braking action.

The present valve is an improvement over prior fluid pressure brake valves because it provides a two pedal application valve that can be used both to assist steering and to achieve a full braking action. A further improvement of the present device over prior valves is its ability to permit the operator to better feel the amount of braking desired through a reactionary effect produced in each or both of the juxtaposed pedals.

One of the principal objects of the present invention is to provide a fluid pressure valve for use on tractors and similar vehicles in which two juxtaposed pedals are provided to enable the operator to assist steering in either direction and to effect full braking of the vehicle.

Another object is to provide an improved braking system which can be so controlled by the operator so as to assist in steering.

Another object of the present invention is to provide a fluid pressure valve which supplies braking pressure only to the wheel corresponding to the pedal depressed while simultaneously shutting off braking pressure to the opposite wheel.

A further object of the invention is the provision of a relatively inexpensive fluid pressure valve that serves the main braking system and also assists in the steering of a vehicle.

A still further object of the invention is to provide a reaction type fluid pressure valve for tractors and similar vehicles which simultaneously applies fluid pressure to one wheel while relieving fluid pressure in another.

Another object is to provide a braking system in which the valves are normally open for compensation purposes due to temperature changes and the like. These and other objects and advantages will become apparent hereinafter.

Briefly, the present invention includes two pedals that control a dual cylinder valve so that pressure fluid from a master cylinder actuates opposite wheel brake motors simultaneously or independently depending on whether one or both pedals are depressed. The invention also consists in the parts and in the arrangements and combinations of parts hereinafter described and claimed.

In the accompanying drawings, in which a particular embodiment of the invention is shown for illustrative purposes:

Fig. 1 is a diagrammatic view of a braking system which includes the two pedal valve, Fig. 2 is an enlarged cross-sectional and side elevational view of the valve shown in Fig. 1 in its inoperative or normal condition and showing the fluid connections and the foot pedal arrangements, Fig. 3 is an enlarged cross-sectional view taken along the line 3—3 of Fig. 2 with the exposed section of the valve in a closed condition, and Fig. 4 is a view of the pedals showing in phantom the outline of the operator's foot.

Referring to the drawings in detail, the numeral 10 is a tractor braking and steering valve embodying the present invention. The valve 10 may be mounted on any vehicle that is provided with fluid motors for braking, but for simplicity of understanding, the valve 10 will be assumed installed on a tractor of the general type used for farm or road work. One of the chief difficulties heretofore encountered with tractors has been their inability to easily turn sharp corners when being driven over soft or muddy ground. This inability is accentuated because the steering is usually accomplished by small wheels positioned in front of the tractor which sink down in soft ground and make steering even more difficult. To overcome this difficulty, the present arrangement uses a fluid pressure valve which applies braking pressure to the inside rear wheel when turning the tractor to assist steering and also to permit full tractor braking when it is desired to slow down or stop.

The valve 10 is provided with two juxtaposed foot-operated pedals 11 and 12. Both of the pedals 11 and 12 are shown in Fig. 4 positioned to be operated by one foot. The right pedal 11 operates a pedal arm 13, and the left pedal 12 operates a pedal arm 14. The pedal arm 13 is connected to a rotatable shaft 15 which rotates when the pedal 11 is operated. The pedal arm 14 is connected to a rotatable shaft 16, which has an axial bore 17 in which is positioned the shaft 15. The shafts 15 and 16 are rotatable relative to each other and are connected at their respective right ends to bevel gears 18 and 19.

The bevel gears 18 and 19 are meshed at their respective tops with opposite sides of a pivot gear 20. The pivot gear 20 has a vertically disposed axial bore 21. Extending through the bore 21 is a master cylinder operating lever 22. The lever 22 includes a central annular portion 23 that loosely encircles the shaft 15 between the bevel gears 18 and 19, an upwardly extending pivot gear stud 24 that is positioned in the bore 21 and which is prevented from coming loose therefrom by a nut 25 and a washer 26, and a downwardly extending stud 27 with a bore 27a therethrough.

Fig. 1 shows the downwardly extending stud 27 connected to a pressure control rod 28 that enters the right end of a master cylinder 29. The left end of the master cylinder 29 is connected to a conduit 30 which has its other end connected to a bore 31 in the upper portion of the fluid pressure valve 10. The bore 31 is threaded to receive the conduit 30 and connects with another bore 32 that extends substantially through the top of the valve 10. Another threaded bore 33 connects the left end of the bore 32 and is provided with a plug 34. The plug 34 may be replaced with the end of conduit 30 if desired and inserted instead in bore 31.

Extending downwardly from the bore 32 near the ends thereof is a bore 35 and a bore 36 both of which are shown threaded. The bores 35 and 36 connect the bore 32 with larger bores 37 and 38 respectively inside the valve 10.

Threadedly positioned in the bores 35 and 36 and extending downwardly from the upper ends of the bores 37 and 38 are valve seat members 39 and 40 respectively. The valve seat member 39 has connecting vertically disposed axial bores 41 and 42 that connect the bore 32 with the bore 37. Similarly, the valve seat member 40 has connecting vertically disposed axial bores 43 and 44 for providing a fluid pressure path therethrough.

Extending downwardly from the bores 37 and 38 are bores 45 and 46 respectively which slidably position valve plunger members 47 and 48 respectively.

The valve plunger member 47 has a resilient sealing cup 49 positioned in a bore 50 in the top thereof in vertical alignment with the bore 42 in the valve seat member 39. An annular seal 51 is in a groove 52 in the outer surface of the plunger member 47 and seals the plunger member 47 to the bore 45 to prevent the undesirable escape of fluid thereby.

The valve plunger member 48 has a resilient sealing cup 53 positioned in a bore 54 in its top in vertical alignment with the bottom end of the bore 44 in the valve seat member 40. An annular seal 55 in annular groove 56 in the plunger 48 prevents the escape of fluid pressure thereby.

The valve plunger members 47 and 48 are also provided with annular flanges 47a and 48a respectively about their upper edge to engage the lower wall of the bores 37 and 38 to limit the downward travel thereof.

Positioned in the bores 37 and 38 about the valve seat members 39 and 40 are compression springs 57 and 58 that are held under compression between the upper end of the bores 37 and 38 and the upper end of the valve plunger members 47 and 48. The springs 57 and 58 bias the plunger members 47 and 48 downwardly and out of engagement with the valve seat members 39 and 40 during normal operation of the tractor.

Entering the bores 37 and 38 from opposite sides of the valve 10 are bores 59 and 60 respectively. The bores 59 and 60 connect the bores 37 and 38 with threaded bores 61 and 62 that receive one end each of fluid pressure conduits 63 and 64 respectively. The other ends of the conduits 63 and 64 are connected to brake fluid motors 65 and 66 in tractor wheel brake assemblies 67 and 68 respectively.

Annular resilient dirt guards 69 and 70 are positioned in grooves 71 and 82 in the lower end of the plunger members 47 and 48. The upper ends of the guards 69 and 70 are fastened to the lower ends of a valve housing 73 and 74 respectively.

Below the plunger members 47 and 48 are adjustable valve operating screws 75 and 76 that have screw heads 77 and 78 for cooperation with the lower ends of the plunger members 47 and 48. The screws 75 and 76 are threadedly positioned in upwardly extending studs 79 and 80 connected to the pedal arms 13 and 14 respectively. The screws 75 and 76 can be rotated in either direction to raise or lower the heads 77 and 78 to achieve the desired adjustment.

Lock nuts 81 and 82 respectively, are provided on the screws 75 and 76 for holding them in fixed position in the studs 79 and 80 when they are properly adjusted.

*Operation*

Having described in detail the components of the fluid pressure valve 10 and the related parts as illustrated in the accompanying drawings, a detailed description of the operation follows.

To the tractor operator seated on the tractor the present invention presents itself as the two foot-operated pedals 11 and 12. If the operator presses down on one pedal only fluid braking pressure will be exerted only in the brake motor corresponding to that pedal. As a result the tractor will turn in the direction of the wheel being braked. If the operator pushes down equally on both pedals full braking is affected and the tractor will slow down or stop without turning at all. In practice, it has been found that the operator may also apply varying amounts of force to the pedals in order to "feel" the particular action needed in a particular situation.

In the usual situation the pedals 11 and 12 are positioned side by side so that the operator can use one foot to perform all operations. This relieves the other foot for operating the clutch. However, it is anticipated that the device could be operated by both feet as in the case of a vehicle that is not equipped with a foot clutch.

To explain the operation, it will be assumed first that the pedal 11 in Fig. 2 is alone depressed. As the pedal 11 moves down, the stud 79 and the screw 75 move down also. When the flange 47a engages the lower end of the bore 37 it can move down no further and any further pressure on the pedal 11 will cause the screw head 77 to move away from the bottom of the valve plunger member 47.

With the valve plunger member 47 in the downward position, the pressure fluid entering the bores 41 and 42 from the bore 32 and the master cylinder 29 has free passage to the brake motor 65 by way of the bores 59 and 61, and the conduit 63.

The downward travel of the pedal 11 also rotates the shaft 15 and the bevel gear 18 to which it is attached. Rotation of the bevel gear 18 rotates the pivot gear 20. Two results are produced when the pivot gear 20 rotates due to pressure of only one of the pedals 11 or 12.

One result is that there is a force produced on the opposite bevel gear, 19 in this case, which is directed to rotate the bevel gear 19 in the opposite direction from the bevel gear 18, thereby rotating the shaft 16. The reverse rotation of the shaft 16 causes the pedal arm 14 and the screw 76 to move upward. The upward movement of screw 76 acts against the valve plunger member 48 to move it upward until the resilient sealing cup 53 is engaged with the lower end of the valve seat member 40. When this occurs no pressure fluid can reach the brake motor 66 from the master cylinder 29 through the bores 32, 36, 43 and 44, 60, and 62.

The other result achieved as additional foot pressure is exerted on the pedal 11 is to increase the amount of fluid pressure to the fluid motor 65. This comes about because the valve plunger member 48 can move no further upward once the sealing cup 53 is engaged with the seat member 40. The bevel gear 19 is therefore in a locked condition. In this condition, any additional pressure on the pedal 11 will cause the pivot gear 20 to revolve about the axis of the bevel gear 19. Because the pivot gear 20 is loosely mounted on the operating lever 22, the operating lever 22 will be rotated about the shaft 15. The downwardly extending stud 27 on the lever 22, which is connected to the master cylinder 29 by the rod 28, will be moved by the rotation of the lever 22 in such a manner as to develop increased fluid braking pressure in the master cylinder 29. The fluid pressure will be fed to the fluid brake motor 65 through conduit 30, bores 31, 32, 41, 42, 37, 59, 61 and into conduit 63.

The same result will be achieved in the fluid motor 66 of the opposite tractor wheel if the pedal 12 instead of the pedal 11 is depressed. Depression of either pedal rotates its corresponding bevel gear in the same direction and consequently rotates the opposite bevel gear in a reverse direction.

Fig. 3 shows the valve plunger member 48 in the seated or uppermost position in which position it would be if only the pedal 11 is depressed.

If both of the pedals 11 and 12 are simultaneously depressed both valve plunger members 47 and 48 remain in the lowermost position and the pivot gear 20 revolves about the shaft 15. The resulting rotation of the master cylinder operating lever 22 develops fluid pressure in the master cylinder 29 which forces pressure fluid to both of the wheel brake fluid motors 65 and 66. This action gives full braking effect to the tractor wheels.

From the foregoing, it is obvious that the plunger members 47 and 48 remain in an open position for compensation purposes when the brakes are not applied. This is necessary to compensate for any temperature changes which increase or decrease the volume of fluid. It is also desirable to have a normally open system to aid in the "bleeding" of the system.

This invention is intended to cover all changes and modifications of the example of the invention herein chosen for purposes of the disclosure, which do not constitute departures from the spirit and scope of the invention.

What I claim is:

1. An application valve for fluid brake systems on vehicles having left and right wheels, said valve adapted to be operated by a brake pedal having juxtaposed left and right portions capable of operation independently or simultaneously, said valve comprising a valve housing having an inlet adapted to be connected to a master cylinder and two outlets adapted to be connected to left and right wheel brake motors in the respective wheels, two normally unobstructed passages in the housing associated with said pedal portions connecting the inlet with said outlets, passage obstructing means in said housing associated with each of said passages and positioned to operatively engage the left and right pedal portions for movement between the normally unobstructed condition of all of the passages and a condition in which one of said passages is obstructed in response to independent movement of the pedal associated with the opposite passage.

2. An application valve for fluid brake systems on vehicles having left and right wheels, said valve adapted to be operated by a brake pedal having juxtaposed left and right portions capable of operation independently or simultaneously, said valve comprising a valve housing having an inlet adapted to be connected to a master cylinder and two outlets adapted to be connected to left and right wheel brake motors in the respective wheels, two normally unobstructed passages in the housing associated with said pedal portions connecting the inlet with said outlets, a normally opened valve member associated with each of said passages including means thereon positioned to operatively engage the left and right pedal portions for movement between the normally open condition of both of the passages and a condition in which one of said passages is closed in response to independent movement of the pedal associated with the opposite passage, and adjustment means associated with the normally open valve members and with the pedal portions for adjusting the travel of the pedal portions.

References Cited in the file of this patent
UNITED STATES PATENTS 2,741,337 Ziskal _____ Apr. 10, 1956